US009853763B2

United States Patent
Bonk et al.

(10) Patent No.: US 9,853,763 B2
(45) Date of Patent: Dec. 26, 2017

(54) OPTICAL LINE TERMINAL FOR A PASSIVE OPTICAL WAVELENGTH DIVISION MULTIPLEX NETWORK

(71) Applicant: Alcatel Lucent, Boulogne-Billancourt (FR)

(72) Inventors: Rene Bonk, Stuttgart (DE); Harald Schmuck, Stuttgart (DE); Wolfgang Poehlmann, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 29 days.

(21) Appl. No.: 14/916,615

(22) PCT Filed: Sep. 19, 2014

(86) PCT No.: PCT/EP2014/069954
§ 371 (c)(1),
(2) Date: Mar. 4, 2016

(87) PCT Pub. No.: WO2015/044036
PCT Pub. Date: Apr. 2, 2015

(65) Prior Publication Data
US 2016/0197697 A1 Jul. 7, 2016

(30) Foreign Application Priority Data

Sep. 30, 2013 (EP) ...................................... 13306352

(51) Int. Cl.
*H04B 10/25* (2013.01)
*H04J 14/02* (2006.01)
(Continued)

(52) U.S. Cl.
CPC .......... *H04J 14/0221* (2013.01); *H04B 10/27* (2013.01); *H04B 10/272* (2013.01); *H04B 10/2972* (2013.01); *H04J 14/0282* (2013.01)

(58) Field of Classification Search
CPC ................ H04B 10/2972; H04B 10/27; H04B 10/272; H04J 14/0282; H04J 14/0221
(Continued)

(56) References Cited

U.S. PATENT DOCUMENTS 6,941,074 B2 * 9/2005 Nakamura ......... H04B 10/2503
359/341.2
2002/0114060 A1 * 8/2002 Kobayashi ............. H04B 10/03
359/334
(Continued)

FOREIGN PATENT DOCUMENTS

CN 1307409 A 8/2001
CN 200983593 Y 11/2007
(Continued)

OTHER PUBLICATIONS

P. Jurcevi, "Performance enhancement in CWDM systems", May 31, 2008, pp. 1-68, XP055091830, Vienna.
(Continued)

*Primary Examiner* — Juan A Torres
(74) *Attorney, Agent, or Firm* — Harness, Dickey & Pierce, P.L.C.

(57) ABSTRACT

Proposed is an OLT for a passive optical wavelength division multiplex network. The network contains optical transmitters for generating downstream signals of an L-Band, as well as optical receivers for receiving upstream signals of a C-Band. Furthermore, the OLT contains a bi-directional SOA and an optical interface. The optical interface, the SOA, the transmitters and the receivers are optically coupled such that an upstream signal received at the optical interface is firstly provided to the bi-directional SOA and subsequently from the SOA to one of the receivers, and such that a downstream signal generated by one of the transmitters is firstly provided to the bi-directional SOA and then subsequently to the optical interface. The bi-directional SOA has a gain function that is not constant with respect to a wavelength of an optical signal to be amplified. Furthermore, the gain function is maximal for a wavelength located within the C-band.

11 Claims, 7 Drawing Sheets (51) Int. Cl.
*H04B 10/272* (2013.01)
*H04B 10/297* (2013.01)
*H04B 10/27* (2013.01)

(58) Field of Classification Search
USPC .......................................................... 398/58
See application file for complete search history.

(56) References Cited

U.S. PATENT DOCUMENTS

| 2004/0100684 | A1* | 5/2004 | Jones | H01S 3/2383 |
| | | | | 359/337.11 |
| 2010/0239258 | A1 | 9/2010 | Calabretta et al. | |
| 2011/0222855 | A1 | 9/2011 | Kim et al. | |

FOREIGN PATENT DOCUMENTS

| CN | 101237293 A | 8/2008 |
| WO | WO-03/058835 A1 | 7/2003 |
| WO | WO-2008145464 A1 | 12/2008 |
| WO | WO-2009078572 A1 | 6/2009 |

OTHER PUBLICATIONS

International Search Report PCT/ISA/210 for International Application No. PCT/EP2014/069954 dated Oct. 9, 2014.
Written Opinion of the International Searching Authority PCT/ISA/237 for International Application No. PCT/EP2014/069954 dated Oct. 9, 2014.

\* cited by examiner

OPTICAL LINE TERMINAL FOR A PASSIVE OPTICAL WAVELENGTH DIVISION MULTIPLEX NETWORK

FIELD OF THE INVENTION

The invention relates to an Optical Line Terminal for a passive optical wavelength division multiplex (WDM) network.

BACKGROUND

A Passive Optical Network (PON) is a type of an optical access network, which allows a plurality of users to be connected to a node of a core network that is for instance a metropolitan area network.

A PON typically comprises at the interconnection of the passive optical network and the core network an Optical Line Termination (OLT). The OLT is considered as a part of the PON. The OLT is connected to an Optical Distribution Network (ODN), which is also a part of the PON. The ODN comprises a plurality of optical links and passive optical components arranged so as to form a point to multipoint structure whose root is connected to the OLT.

The OLT is typically located at the so called Central Office (CO) of the service provider. Each optical link of the OLT may be terminated at its far end by a respective Optical Network Unit (ONU).

In a WDM PON, each ONU may communicate with the OLT, by using a respective set of wavelengths comprising an upstream wavelength, which the ONU uses for data transmission from the ONU to the OLT, and a downstream wavelength, which the OLT uses for transmission from the OLT to the ONU.

In a WDM PON, the ODN typically comprises a so called remote node, a feeder optical fiber connecting the remote node to the OLT and a number of distribution optical fibers radiating from the remote node. Each distribution fiber may be terminated at its far end by an ONU or by a power splitter connecting the distribution fiber to the multiple ONUs via respective optical drop fibers.

In the downstream direction, the OLT generates downstream optical signals at the downstream wavelengths associated to the ONUs using respective transmitters. The OLT multiplexes the different downstream signals according to the known WDM technique and transmits them to the remote node along the feeder fiber. At the remote node, the downstream signals may be de-multiplexed by an optical de-multiplexing device onto the distribution fibers and thus transmitted to the respective ONUs along the respective distribution fibers. Alternatively, the downstream signals may be split in power at the remote node onto the distribution fibers using an optical splitting device and thus transmitted towards the ONUs via the distribution fibers.

In the upstream direction, each ONU generates a respective upstream signal at the respective upstream wavelength associated thereto and transmits this signal along the respective distribution fiber to the remote node. The remote node multiplexes the upstream signals received from the various ONUs via the different distribution fibers according to the known WDM technique and forwards them to the OLT through the feeder fiber. At the OLT, the upstream signals are de-multiplexed and provided to respective receivers.

The remote node may be a passive node, which means, that the remote comprises only passive optical components for de-multiplexing or splitting the downstream signals and multiplexing the upstream signals.

Due to the fact that the different optical signals transmitted within a PON are subject to the effect of attenuation caused by the optical fibers of the PON as well as possibly the effect of power reduction due to power splitting, there is a need to counteract these effects. A solution known from the prior is to foresee within the PON an amplification device that is preferably called reach extender. Such an amplification device may be placed along the optical feeder fiber close to the remote node. Within the reach extender, the upstream signals and the downstream signals are separated from each other. The upstream signals are then amplified by a first optical amplifier within the reach extender while the downstream signals are then amplified by a different, second optical amplifier within the reach extender. Usually, the first optical amplifier causes an amplification of the upstream signal by a gain value that is similar to a gain value of an amplification of the downstream signal caused by the second amplifier. Subsequent to the amplification, the upstream and downstream signals are provided for optical transmission in their respective transmission directions.

SUMMARY

Proposed is an optical line terminal for a passive optical wavelength division multiplex network. The network contains
  multiple optical transmitters that are operable to generate respective downstream signals having respective different wavelengths that are located in an L-Band,
  multiple optical receivers that are operable to receive respective upstream signals having respective different wavelengths that are at least partially located in a C-Band,
  a bi-directional optical amplifier and
  an optical interface.
The optical interface, the bi-directional optical amplifier, the transmitters and the receivers are optically coupled such that
  an upstream signal received at the optical interface is firstly provided to the bi-directional optical amplifier and subsequently from the bi-directional optical amplifier to one of the receivers,
  a downstream signal generated by one of the transmitters is firstly provided to the bi-directional optical amplifier and then subsequently to the optical interface.
The bi-directional optical amplifier has a gain function that is not constant with respect to a wavelength of an optical signal to be amplified by the bi-directional optical amplifier. Furthermore, the gain function is parabolic and thus not constant in dependence on an optical wavelength, the gain function has essentially a maximal gain value for a wavelength located within the C-band. Preferably, the gain function has a decreased gain value for a wavelength located within the L-band.

BRIEF DESCRIPTION OF THE DRAWINGS

FIG. 1 shows a passive optical network PON, which is connected at the central office CO via an optical line terminal (OLT) to a core network CN.

Figure 1:
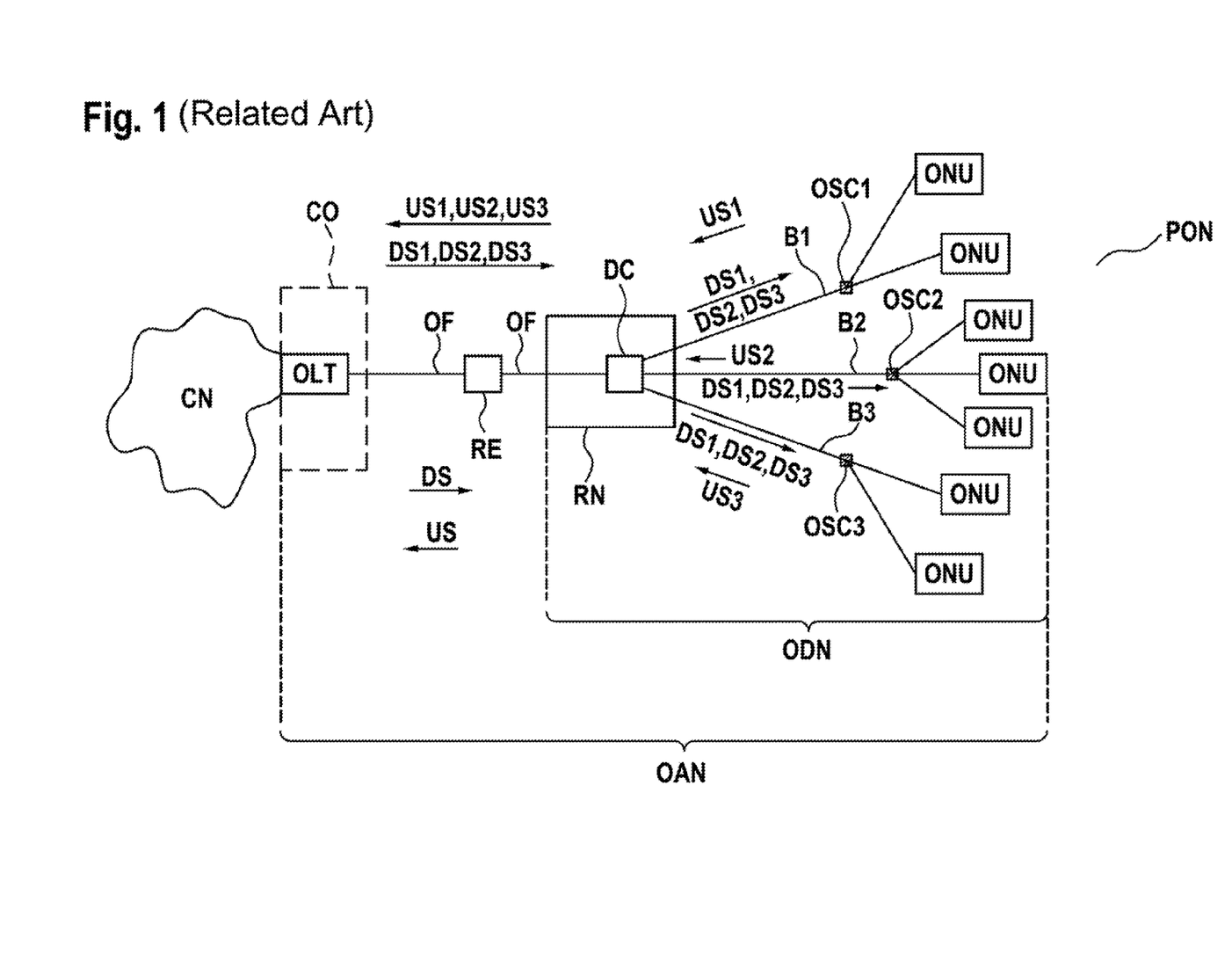
FIG. 1 shows a general structure of a passive optical network.

The OLT is connected via an optical feeder fiber OF to a remote node RN. Downstream signals DS1, DS2, DS3 are transmitted at respective downstream wavelengths to the remote node RN in a downstream direction DS.

The branches B1, B2, B3 of the distribution network may themselves contain further splitting units OSC1, OSC2 OSC3 for furthermore splitting the downstream signals. At the end of the optical branches B1, B2, B3, customer sided access network termination units in the form of optical network units ONU are connected, which are alternatively Optical Network Terminals (ONT).

The distribution of the downstream signals DS1, DS2, DS3 is performed by the optical splitting unit OSC, which splits the downstream signals DS1, DS2, DS3 onto the branches B1, B2, B3. The optical splitting units OSC1, OSC3 may split the downstream signals by means of power splitting, such that each of the downstream signals DS1, DS2, DS3 is split onto each of the branches B1, B2, B3. Each downstream signal DS1, DS2, DS3 of a specific wavelength carries one or more date signals that are assigned to one or more ONUs. Each ONU is assigned a specific downstream wavelength. The remote node RN receives the downstream signals and distributes them onto the optical branches B1, B2, B3 that are connected to the remote node RN.

According to a first solution, shown in FIG. 1, the remote node RN contains an optical power splitter, which splits the power of the downstream signals DS1, DS2, DS3 onto the branches B1, B2, B3 that are connected to the remote node RN. According to this first solution, all ONUs receive all downstream signals. According to a second solution, not explicitly shown in FIG. 1, the remote node contains an optical wavelength multiplexer/de-multiplexer, which multiplexes the downstream signals DS1, DS2, DS3 such that a specific downstream signal with a specific wavelength that carries data signals assigned to one or more specific ONUs is provided only onto the specific branch of these specific ONUs. The optical wavelength de-multiplexer is preferably an Arrayed Waveguide Grating (AWG). According to this second solution, an ONU receives a downstream signal only at that downstream wavelength which is assigned to this ONU.

The ONUs transmit respective upstream signals US1, US2, US3 at respective upstream wavelengths that are assigned to the ONUs in an upstream direction US. The upstream signals US1, US2, US3 are combined by the optical splitting units OSC1, OSC2, OSC3. In the case of a WDM PON, the remote node RN, the upstream signals US1, US2, US3 are multiplexed onto the feeder fiber OF by an optical multiplexing device, which is preferably the previously mentioned AWG. In the case that the PON is a Time-Wavelength-Division-Multiplex (TWDM) PON, the remote node RN contains a power splitter that combines the upstream signals US1, US2, US3. The upstream signals and the downstream signals are affected by signal attenuation along the optical fibers of the PON, thus reducing the power levels of these signals at their respective receiving side. Furthermore, the downstream signals may be subject to power splitting, which also causes a reduction of the power levels of the downstream signals at their respective receiving side. Within the OLT and the ONUs, the optical signals are usually detected by optical receivers containing photo diodes for optical-electrical conversion. Such photo diodes have a limited sensitivity. In the case that the power level of a received optical signal falls below a certain threshold, then the detected signal may be erroneous. Therefore, upstream and downstream signals may only be transmitted over certain optical transmission distances within the PON. Furthermore, the downstream signals may only be split in power a certain number of times.

The difference between the optical output power of the transmitter and the maximal sensitivity of the receiver is preferably called the budget. For efficient operation of the PON, this budget should be high.

A prominent solution for allowing a transmission of the optical signals over greater optical distances and via a greater number of power splitting devices within the PON is an amplification device RE, which is preferably called a reach extender. The reach extender RE is placed along the optical feeder fiber, preferably close to the remote node. The reach extender RE amplifies the upstream and the downstream signals.

Figure 2:
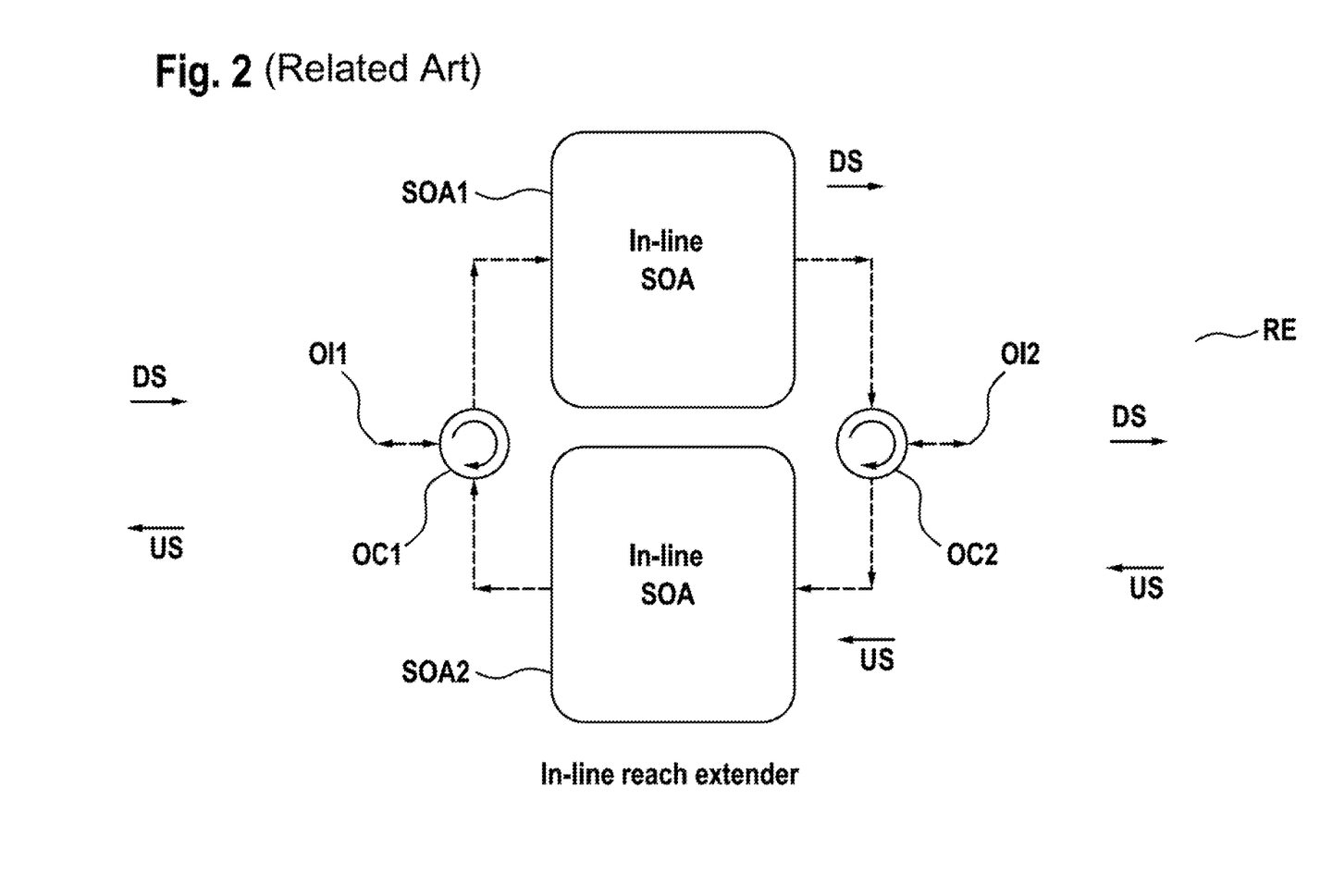
FIG. 2 shows a reach extender.

FIG. 2 shows an example of a reach extender RE. At an optical interface OI1, the downstream signals are received in the downstream direction DS from one section of the optical feeder fiber. The downstream signals are provided to a first semiconductor optical amplifier SOA1 using an optical circulator OC1. The amplifier SOA1 amplifies the downstream signals. At an optical interface OI2, the upstream signals are received in the upstream direction US from another section of the optical feeder fiber. The upstream signals are provided to a second semiconductor optical amplifier SOA2 using an optical circulator OC2. The amplifier SOA2 amplifies the upstream signals. The amplified downstream signals are provided to the optical interface OI2 in the downstream direction DS using the circulator OC2. The amplified upstream signals are provided to the optical interface OI1 in the upstream direction DS using the circulator OC1. Usually, the amplifier SOA2 causes an amplification of the upstream signals by a gain value that is similar to a gain value of an amplification of the downstream signals caused by the amplifier SOA1. To summarize the above, a solution using a reach extender uses two separate amplifiers with essentially equal gain values for the respectively amplified signals.

DESCRIPTION OF EMBODIMENTS

Figure 3:
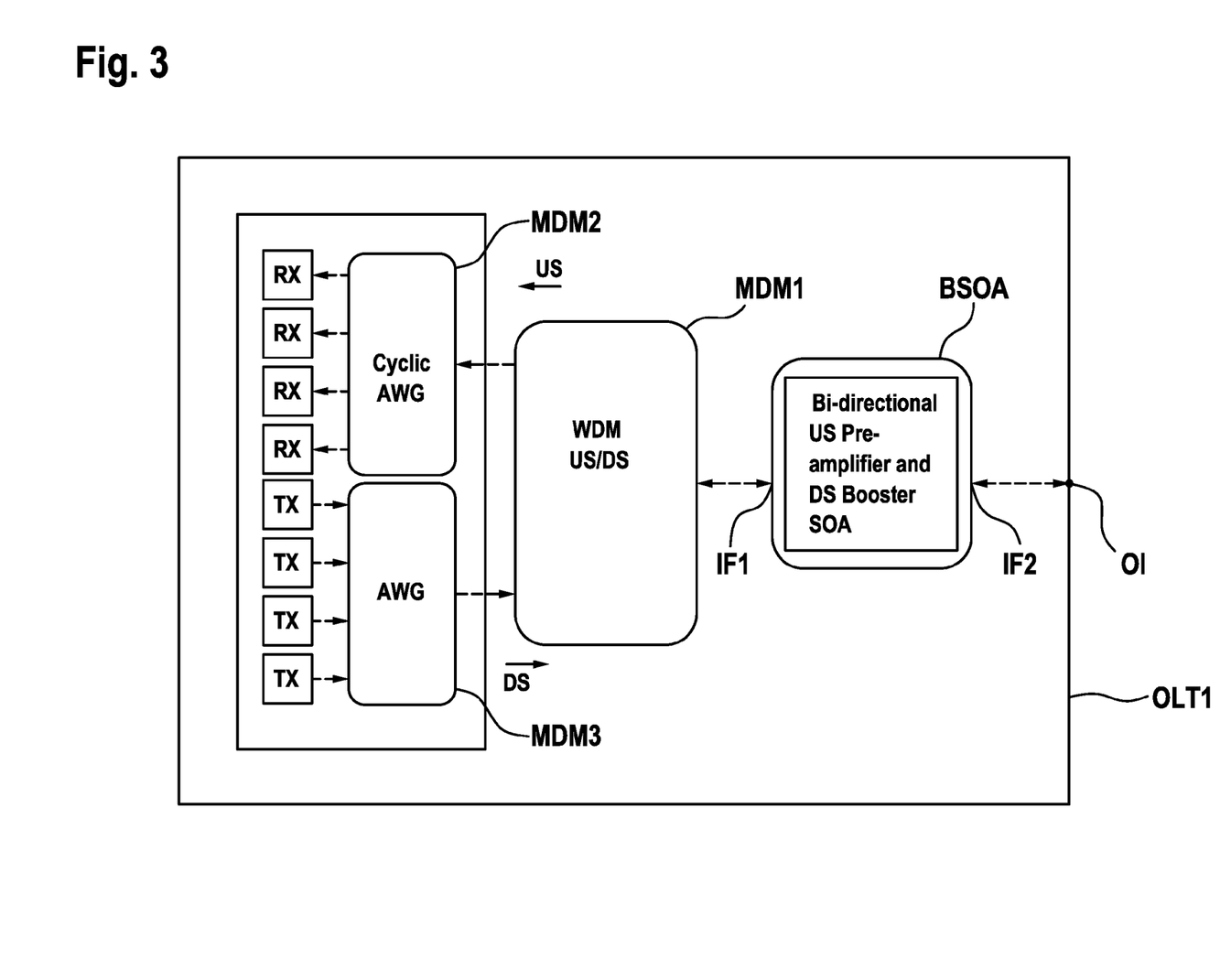
FIG. 3 shows a proposed optical line terminal.

FIG. 3 shows a proposed optical line terminal OLT for a passive optical WDM network, which is preferably a Time-Wavelength-Division-Multiplex (TWDM) network of the type NG-PON2.

The OLT contains multiple optical transmitters TX that are operable to generate respective downstream signals having respective different wavelengths that are located in a spectral region of the L-Band. The L-Band has a wavelength range of 1565 up to 1625 nanometers (nm). Preferably, the downstream wavelengths are located within a sub-band of the L-Band with a wavelength range of 1596-1603 nm, which is preferably called downstream band. The transmitters TX contain preferably respective laser diodes for generating the downstream signals. The wavelength separation of different downstream signals is given by a wavelength difference of maximally 7 nm.

Furthermore, the OLT contains optical receivers that are operable to receive respective upstream signals having respective different wavelengths that are at least partially located in a C-Band. In other words, the OLT contains optical receivers that are operable to receive respective upstream signals having respective different wavelengths that are essentially located in a C-Band. The C-Band has a wavelength range of 1530 up to 1565 nm. The upstream wavelengths are preferably located in a wavelength range of 1524-1544 nm, which is preferably called upstream band. The wavelength separation of different upstream signals with different adjacent upstream wavelengths is given by a wavelength difference of maximally 20 nm.

Figure 7:
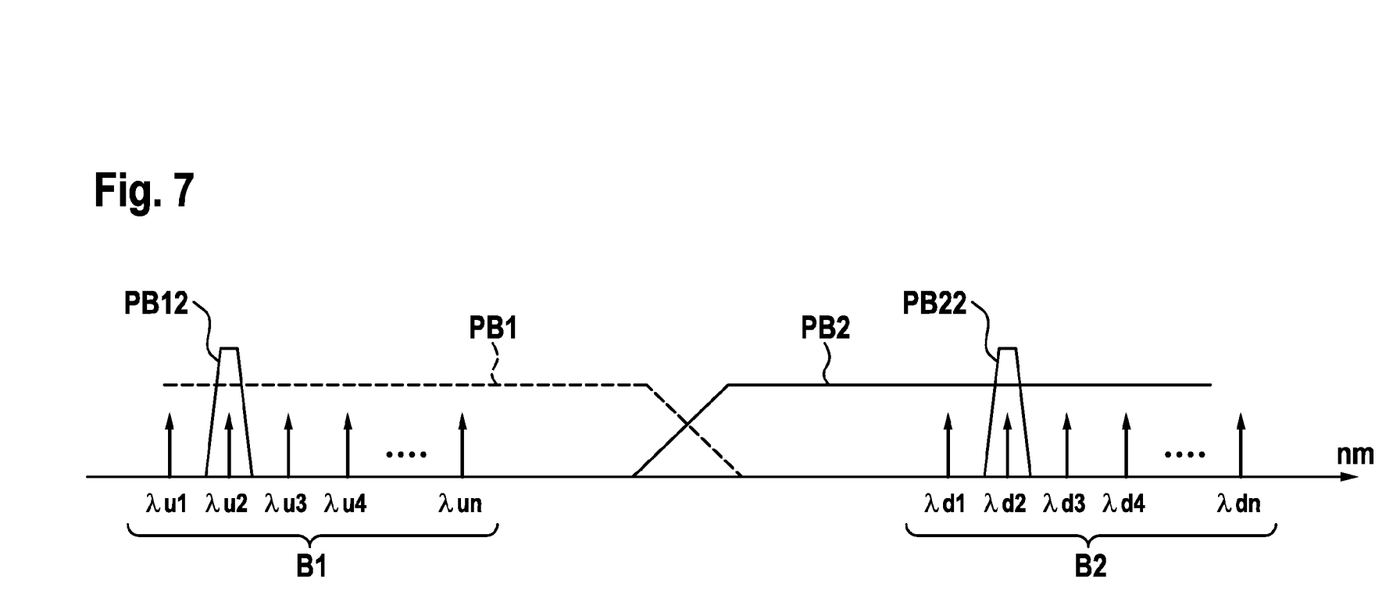
FIG. 7 shows an allocation of upstream and downstream wavelengths

FIG. 7 shows upstream wavelengths λu1, λu2, . . . λun that are comprised in a waveband PB1, whereas the downstream wavelengths λd1, λd2, . . . λdn are comprised in a waveband PB2. The waveband PB1 and the second waveband PB2 do not overlap. The waveband PB1 is upstream hand, whereas the waveband PB2 is the downstream band. Adjacent downstream wavelengths λd1, λd2, . . . λdn and adjacent upstream wavelengths λu1, λu2, . . . λun are preferably spaced as it will be described in detail further below.

A wavelength of the upstream hand is separated from a wavelength of the downstream band by maximally 80 nm, preferably 79 nm. A wavelength of the upstream band is separated from a wavelength of the downstream band by minimally 50 nm, preferably 52 nm.

Coming back to FIG. 3, the OLT contains a bi-directional amplifier BSOA, which is preferably a bi-directional semiconductor optical amplifier (SOA). The amplifier BSOA has two optical interfaces IF1, IF2.

Downstream signals generated by the transmitters TX are provided to the interface IF1 of the bi-directional semiconductor optical amplifier BSOA in the downstream direction DS. In detail, the different downstream signals of the different wavelengths are multiplexed onto the interface IF1 of the amplifier BSOA using an optical multiplexer MDM 3, which is preferably an AWG, and using furthermore a multiplexer/de-multiplexer MDM1, which is preferably a dielectrical optical filter for separating the upstream band from the downstream band. The multiplexer MDM 3 has different pass-bands for the different downstream wavelengths, such as for example a pass-band PB22 for a downstream wavelength λd2 shown in FIG. 7.

The amplified downstream signals leaving the amplifier BSOA at the interface IF2 are then provided to an optical interface OI of the OLT in the downstream direction DS. The interface OI may be optically coupled to an optical fiber such as an optical feeder fiber.

Upstream signals received at the interface OI are provided in the upstream direction US from the optical interface OI of the OLT to the interface IF2 of the amplifier BSOA. The amplified upstream signals are then provided from the interface IF1 to the multiplexer/de-multiplexer MDM1.

The multiplexer/de-multiplexer MDM1 de-multiplexes the upstream signals lying in the upstream band from the downstream signals lying in the downstream band. The multiplexer/de-multiplexer MDM1 provides the amplified upstream signals to a de-multiplexer MDM2, which is preferably a cyclic AWG. The de-multiplexer MDM2 de-multiplexes the different upstream signals onto respective optical receivers RX. The receivers contain respective Avalanche Photo Diodes (APN) for detecting the respective upstream signals. The de-multiplexer MDM 2 has different pass-bands for the different upstream wavelengths, such as for example a pass-band PB12 for an upstream wavelength λu2 shown in FIG. 7.

To summarize the above in other words, the optical interface OI, the amplifier SOA, the transmitters TX and the receivers RX are optically coupled by one more optical filtering devices MDM1, MDM2, MDM3 such that an upstream signal received at the optical interface OI is firstly provided to the bi-directional amplifier BSOA and subsequently from the amplifier BS SOA to one of the receivers RX. Furthermore, the optical interface OI, the amplifier SOA, the transmitters TX and the receivers RX are optically coupled such that a downstream signal generated by one of the transmitters TX is firstly provided to the bi-directional amplifier BSOA and then subsequently to the optical interface OI.

Figure 4:
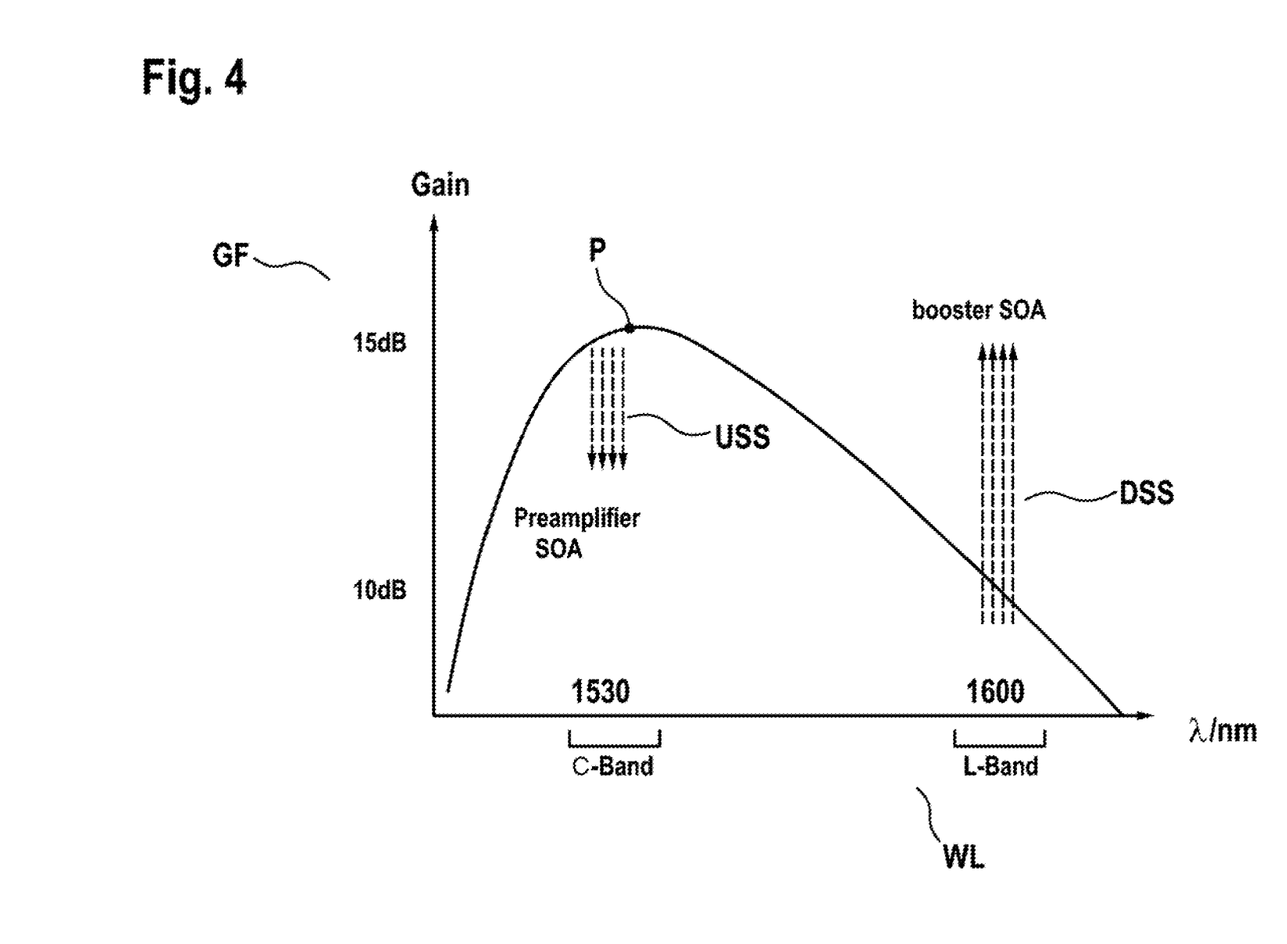
FIG. 4 shows a gain function of a bi-directional amplifier.

FIG. 4 shows a wavelength dependent gain function GF, alternatively called gain spectrum, of the bi-directional semiconductor optical amplifier BSOA over previously shown in FIG. 3. The gain function GF is plotted over the wavelength WL of an optical signal amplified by the amplifier. The bi-directional SOA has a gain function that is not constant with respect to a wavelength of an optical signal to be amplified. The gain function GF is maximal and thus has a peak P for an upstream wavelength of an upstream signal located within the upstream band. Since the upstream band of reaches from 1524 nm up to 1544 nm, and since the C-Band reaches from 1530 nm up to 1565, the gain function GF thus is essentially maximal and thus has essentially a peak P for an upstream wavelength of an upstream signal located within the C-band. Preferably, the gain peak P is centered at the low-wavelength edge of the upstream band, which is not shown explicitly in FIG. 4. The gain function has gain values for the wavelengths of the upstream band that are at least 3 dB lower than the gain values for the wavelengths of the upstream band. The gain function has gain values for the wavelengths of the upstream band that are not more than 5 dB below the gain values for the wavelengths of the C-Band.

As previously mentioned, the wavelength separation of different upstream signals with different adjacent upstream wavelengths is preferably given by a wavelength difference of maximally 20 nm, thus ensuring that the gain function of the SOA does not change significantly within the upstream band due to the gain slope around the peak P.

As previously mentioned, the wavelength separation of different downstream signals with different adjacent upstream wavelengths is given by a wavelength difference of maximally 7 nm, thus ensuring that the gain function of the SOA does not change significantly within the upstream band.

Preferably, the gain function GF has a gain value for the upstream band in the range of 15 to 20 dB.

Different advantages that may be achieved by the proposed solution are now explained in detail.

Coming back to FIG. 3, one has to consider the function of the bi-direction amplifier BSOA. Due to the fact that the amplifier BSOA is located within the OLT, the amplifier acts as a booster amplifier for downstream wavelengths and at the same time as a pre-amplifier for upstream wavelengths. The downstream wavelengths have power levels that are significantly larger than the power levels of the received upstream wavelengths. For example, the upstream wavelengths may have a power level of −30 dBm, while the downstream wavelengths have a power level of 0 dBm or 1 dBm. In a solution using a reach extender for amplification of the upstream and downstream wavelengths as previously described with regard to the FIGS. 1 and 2, the upstream and downstream wavelengths have power levels that are almost similar or at least do not differ by a power level difference as significant as in the solution proposed herein.

Since the power levels of the upstream wavelengths are quite low, the sensitivity of the receivers RX strongly depends on the gain value achieved by the amplifier BSOA for the upstream signals located in the upstream band. Therefore, it is of advantage that the gain function has its peak with the maximal value within the upstream band. By choosing a gain of 15 to 20 dB for the upstream band and a moderate noise figure of the SOA for the different upstream signals ensures the receiver sensitivity is ensured.

As previously mentioned, the upstream signals have a significantly higher power level when entering the amplifier BSOA than the upstream signals. Thus, the amplification by the amplifier BSOA required for the downstream signals is not as high as the amplification required for the upstream signals. Therefore, choosing a bidirectional SOA with a not constant gain curve having a gain value that is lower for the downstream signals than for the upstream signals is a practical solution here that allows a less costly solution than using two SOAs as bi-directional amplifiers as shown in FIG. 2. In the existing solution using two SOAs as bi-directional amplifier, the SOAs have similar gain values for the upstream signals and the downstream signals.

As previously mentioned, the proposed bi-directional amplifier BSOA has a wavelength dependent gain function that achieves gain values for the downstream wavelengths of not more than 5 dB less than for the upstream wavelengths. If this gain difference was greater, such that the amplifier BSOA had a wavelength dependent gain function that achieved gain values for the downstream wavelengths of more than 5 dB less than for the upstream wavelengths, then such a greater gain difference would have to be compensated by the transmitters TX generating the downstream signals at higher power levels, which would be a more costly solution. Even furthermore, if the downstream signals were generated at too great power levels, then this may cause crosstalk between the downstream and the upstream signals to an extent possibly leading to too many errors when detecting the upstream signals using the receivers RX.

It is necessary that the gain value for the downstream signals is smaller than the gain value for the upstream signals, since otherwise the crosstalk between the downstream and the upstream signals may become too severe. This is ensured by the bi-directional SOA having a nearly parabolic wavelength dependent gain function.

Furthermore, the downstream signals should not be of a too high power level for another reason. The higher the power level of the downstream signals reaching the bi-directional amplifier BSOA, the more the amplifier BSOA is driven towards the saturation state. Driving the amplifier towards this saturation state has the negative effect that the wavelength dependent gain curve GF, shown in FIG. 4, tends to flatten and also the peak value P decreases. This causes a reduction of the amplification of the upstream signals, which in turn may lead to too many errors when detecting the upstream signals using the receivers RC.

Using a semiconductor optical amplifier (SOA) as the bi-directional amplifier BSOA instead of an Erbium Doped Fiber Amplifier (EDFA) with only one pump laser has the advantage, that the difference between the gain values for the upstream band and the downstream band is smaller for an SOA than for such an EDFA, thus allowing a greater amplification of the downstream signals.

The proposed OLT with the different chosen parameters is suitable for use within a TWDM PON of the type NG-PON2. This is now explained in detail with regard to the FIGS. 5 and 6.

Figure 5:
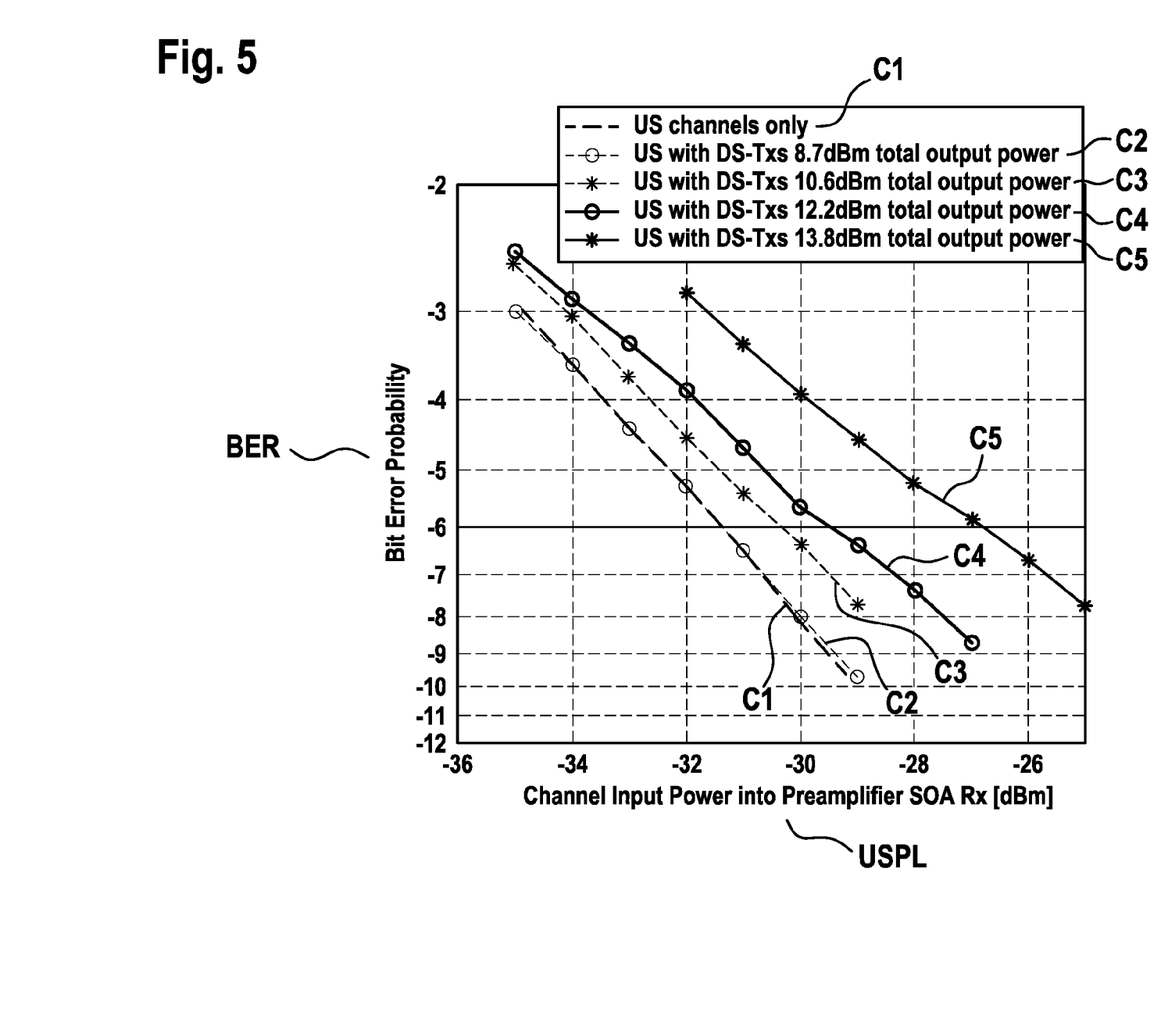
FIG. 5 shows measurement results for upstream signals.

FIG. 5 shows measurement results obtained when operating the bi-directional SOA with two exemplary upstream signals as well as with two exemplary downstream signals simultaneously. The setup comprises the two upstream signals at 1520.77 nm and 1529.55 nm respectively, together with the two downstream channels at 1560.61 nm and 1561.42 nm respectively. All signals are operated with 10 Gbit/s On-Off-Keying and Non-Return-to-Zero modulation. The photodiodes for the OLT receivers are APD diodes, while the photodiodes for the ONU receivers are PIN diodes.

FIG. 5 shows bit-error ratios BER of a received upstream signal for different signal levels. The different input signal power levels USPL of the received upstream signals reaching the input of the bi-directional amplifier are tracked along the x-axis. The different curves C1, C2, C3, C4, C5 show results for different power levels of the downstream signals after amplification by the bi-directional amplifier.

Typically, for upstream or downstream signals carrying forward error correction (FEC) encoded data, a bit-error ratio of $10^{-3}$ should not be exceeded.

The curve C1 indicates that a bit-error ratio of $10^{-3}$ may already be achieved for an upstream power level of appr. −35 dBm in the case that no power level of a downstream signal is present. The curve C2 indicates that this is not significantly changed in the case that the downstream signal has a power level of 8.7 dBm after amplification.

The curve C3 indicates that a bit-error ratio of $10^{-3}$ may already be achieved for an upstream power level of appr. −34 dBm in the case that the downstream signal has a power level of 10.6 dBm after amplification. The curve C4 indicates that a bit-error ratio of $10^{-3}$ may already be achieved for an upstream power level of appr. −33.8 dBm in the case that the downstream signal has a power level of 12.2 dBm after amplification. The curve C5 indicates that a bit-error ratio of $10^{-3}$ may already be achieved for an upstream power level of appr. −31.8 dBm in the case that the downstream signal has a power level of 13.8 dBm after amplification.

The results show, that for downstream power levels equal to or smaller than 12.2 dBm power penalties of equal to or smaller than 1.2 dB are achievable.

Figure 6:
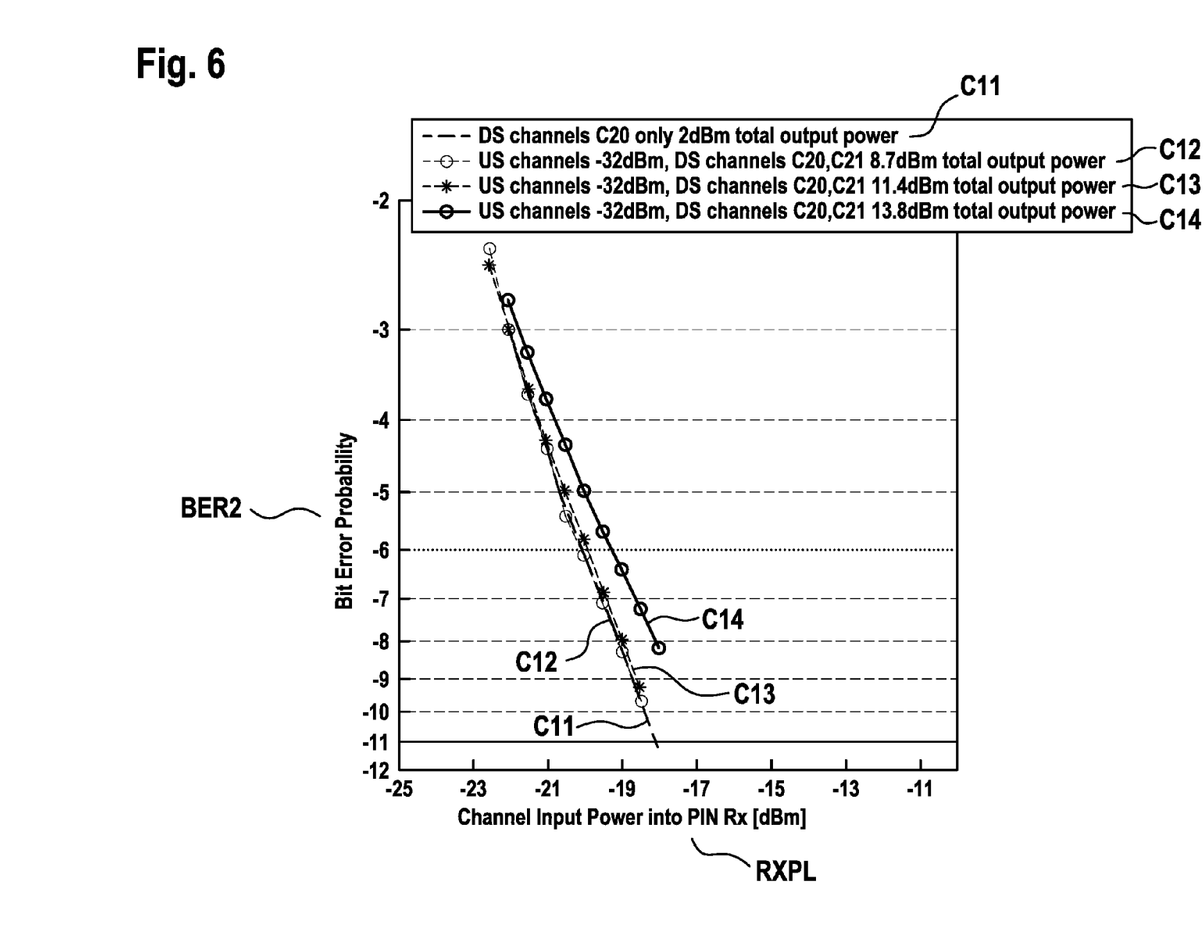
FIG. 6 shows measurement results for downstream signals.

FIG. 6 shows bit-error ratios BER2 when receiving the generated, amplified and transmitted downstream signals at a far end side using PIN diodes. The different input signal power levels RXPL of the received downstream signals reaching the PIN diodes are tracked along the x-axis. The different curves C11, C12, C13, C14 show results for different power levels of the downstream signals after amplification by the bi-directional amplifier. The upstream signals have in this measurement example for the curves C12, C13 and C14 of −32 dBm power level at the input of the bi-directional amplifier of the OLT that generated, amplified and transmitted downstream signals to the far end side simultaneously.

The curve C11 shows that a bit-error ratio of $10^{-3}$ may already be achieved for a downstream power level of 2 dBm after amplification by the bi-directional amplifier in the case that no power level of a downstream signal is present. The bit-error ratio of $10^{-3}$ may already be achieved in the case that the received downstream signal has at the receiving for end side a remaining power level of appr. −22 dBm. The curves C12 and C13 indicate that this is not significantly changed in the case that the downstream power levels after amplification take on the values of 8.7 dBm or even 11.4 dBm. The curve C14 indicates that the necessary remaining power level for achieving a bit-error ratio of $10^{-3}$ is raised only marginally from appr. −22 dBm to appr. −21.8 dBm in the case that the downstream power levels after amplification take on the values of 13.8 dBm. Thus, no significant power penalties are measured.

To summarize the above, the measurement results of the FIGS. 5 and 6 clearly indicate that the proposed OLT is suitable for operation within a PON of the type NG-PON2, allowing an economically efficient solution of an OLT including an amplifier for amplification of the upstream and downstream signals. In other words, the proposed selection of the SOA parameters and the specific wavelength configuration enables the use of the SOA in the NG-PON2 network for bi-directionally amplifying the upstream signals as pre-amplification as well as the downstream signals as a booster amplification.

Due to the gain of about 10 dB for the downstream signals, the saturation output power of about 15 dBm is achievable which provides sufficient output power for the low budget classes in the NG-PON2 standard. The upstream operation is still possible due to low cross-talk which is mainly provided by the wavelength offset between the upstream and downstream channels.

The proposed solution will now be compared to existing ones.

In existing Long-Reach-PON solutions the separation of the downstream and upstream wavelengths is typically larger than 170 nm due to the choice of for example 1490 nm as the downstream center wavelength and 1310 nm as the upstream center wavelength in G-PON or for example 1577 nm as the downstream center wavelength and 1270 nm as the upstream center wavelength in XG-PON. Due to the large separation of the upstream and downstream wavelength channels, it is impractical in such systems to use a single bi-directional SOA to amplify both the downstream and upstream signals simultaneously. The reason is that the downstream wavelengths would experience a gain value in the bi-directional SOA that is clearly more than 5 dB lower than the gain value experienced by the upstream wavelengths, which in turn would require the transmitters of the OLT to provide downstream signals and much higher power levels at higher energy consumption causing laser stability issues as well as higher cost of lasers.

In the proposed solution, the allocation of the upstream signals and the downstream signals is such that the upstream signals are located in the C-Band and the downstream signals are located in the L-Band. In a different solution, in which the upstream and the downstream signals were allocated in an alternating scheme along a same waveband, a bi-directional amplification device amplifying both the upstream and the downstream signals would have to be a linear amplifier having similar gain values for the upstream and the downstream signals. Such a bi-directional linear amplifier with a constant wavelength dependent gain function would not be suitable for use within the OLT described with regard to FIG. 3 and proposed herein.

Since the proposed bi-directional SOA is used for upstream signals located in the C-Band and downstream signals located in the L-Band, the different achieved gain values for the different upstream and downstream signals are achieved leading to the possible advantages as previously described above. If a single bi-directional SOA was used with a gain peak in the O-band, having an approximate bandwidth of 1260 nm up to 1360 nm, this would be of disadvantage, since SOAs designed to have a gain peak within the O-band offer a very narrow spectral 3 dB bandwidth that is typically of only is about 40 nm. This means that such a bi-directional SOA may be used to amplify the upstream signals of the O-Band in an OLT but the remaining gain at downstream wavelengths of appr. 1490 nm within the S-Band of 1460-1530 nm would be too low or even zero.

The invention claimed is:

1. An optical line terminal for a passive optical wavelength division multiplex network comprising:
   multiple optical transmitters operable to generate respective downstream signals having respective different downstream wavelengths that are located in the L-Band;
   multiple optical receivers operable to receive respective upstream signals having respective different upstream wavelengths that are at least partially located in the C-Band;
   a bi-directional optical amplifier; and
   an optical interface,
   wherein said optical interface, said bi-directional optical amplifier, said transmitters and said receivers are optically coupled such that
      an upstream signal received at said optical interface is firstly provided to said bi-directional optical amplifier and subsequently from said bi-directional optical amplifier to one of said receivers, and such that
      a downstream signal generated by one of said transmitters is firstly provided to said bi-directional optical amplifier and then subsequently to said optical interface,
   wherein the coupling is given by one or more optical filtering devices,
   wherein said bi-directional optical amplifier has a wavelength dependent gain function that is not constant and wherein said gain function has a maximal gain value for a wavelength located within said C-band,
   and wherein said gain function has a decreased gain value for a wavelength located within said L-band.

2. The optical line terminal according to claim 1, wherein said amplifier is a semiconductor optical amplifier.

3. The optical line terminal according to claim 1, wherein said passive optical wavelength division multiplex network is a passive optical time wavelength division multiplex network.

4. The optical line terminal according to claim 1, wherein said downstream wavelengths are located within a downstream band with a wavelength range of 1596-1603 nm.

5. The optical line terminal according to claim 1, wherein the bandwidth of said downstream band is 7 nm.

6. The optical line terminal according to claim 1, wherein a wavelength separation of different downstream signals is given by a wavelength difference of maximally 7 nm.

7. The optical line terminal according to claim 1, wherein said upstream wavelengths are located in a upstream wavelength range of 1524-1544 nm.

8. The optical line terminal according to claim 1, wherein the bandwidth of said upstream band is 20 nm.

9. The optical line terminal according to claim 1, wherein said upstream band and downstream band are separated by at least 50 nm.

10. The optical line terminal according to claim 3, wherein said passive optical wavelength division multiplex network is a passive optical time wavelength division multiplex network of the type NG-PON2.

11. The optical line terminal according to claim 1, wherein a lowest upstream wavelength is separated from a highest downstream wavelength by maximally 80 nm.

* * * * *